United States Patent
Kipping et al.

(10) Patent No.: US 10,450,017 B2
(45) Date of Patent: Oct. 22, 2019

(54) PROCESSING STATION FOR FEEDING CLAMPING FRAMES INTO A WORKING AREA AND METHOD FOR CHANGING CLAMPING FRAMES

(71) Applicants: THYSSENKRUPP SYSTEM ENGINEERING GMBH, Heilbronn (DE); thyssenkrupp AG, Essen (DE)

(72) Inventors: Tino Kipping, Schmelz (DE); Achim Schmidt, Freisen (DE)

(73) Assignees: THYSSENKRUPP SYSTEM ENGINEERING GMBH, Heilbronn (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/342,071

(22) PCT Filed: Oct. 23, 2017

(86) PCT No.: PCT/EP2017/077014
§ 371 (c)(1),
(2) Date: Apr. 15, 2019

(87) PCT Pub. No.: WO2018/082956
PCT Pub. Date: May 11, 2018

(65) Prior Publication Data
US 2019/0248434 A1 Aug. 15, 2019

(30) Foreign Application Priority Data
Nov. 3, 2016 (DE) .................... 10 2016 221 569

(51) Int. Cl.
*B62D 65/02* (2006.01)
*B62D 65/18* (2006.01)

(52) U.S. Cl.
CPC .......... *B62D 65/022* (2013.01); *B62D 65/18* (2013.01)

(58) Field of Classification Search
CPC ......... Y10T 29/53313; Y10T 29/53365; Y10T 29/53378; Y10T 29/53539;
(Continued)

(56) References Cited

U.S. PATENT DOCUMENTS 2,973,856 A * 3/1961 Brooks .................. B60P 1/365
198/776
3,746,148 A * 7/1973 Hilger .................. B65G 1/0485
198/774.1
(Continued)

FOREIGN PATENT DOCUMENTS

AT 410 189 B 2/2003
DE 37 20 175 A 12/1988
(Continued)

OTHER PUBLICATIONS

English Translation of International Search Report issued in PCT/EP2017/077014, dated Jan. 12, 2018.

*Primary Examiner* — Jason L Vaughan
(74) *Attorney, Agent, or Firm* — thyssenkrupp North America, Inc.

(57) ABSTRACT

A processing station, for example a framing station, for workpieces formed as vehicle body parts. The station has at least one clamping frame, at least one magazine area for holding the clamping frames, a working area for processing the workpieces and a feed device for feeding the clamping frames between the at least one magazine area and the working area in a longitudinal direction X and a transverse direction Y. The feed device has a floor-based rail arrangement for guiding and carrying the clamping frames.

15 Claims, 9 Drawing Sheets

(58) Field of Classification Search
CPC ........ Y10T 29/53543; Y10T 29/53548; B62D 65/18; B62D 65/02; B26K 37/047
USPC ................ 198/773, 774.1, 775, 776, 750.11
See application file for complete search history.

(56) References Cited

U.S. PATENT DOCUMENTS

| | | | | |
|---|---|---|---|---|
| 3,871,534 | A * | 3/1975 | Bursk | B60P 1/38 414/525.9 |
| 4,400,607 | A * | 8/1983 | Wakou | B23K 37/047 219/79 |
| 4,442,335 | A * | 4/1984 | Rossi | B23K 37/047 219/79 |
| 4,488,493 | A * | 12/1984 | Wakabayashi | B62D 65/18 104/172.4 |
| 4,632,618 | A * | 12/1986 | Issakainen | E21B 19/24 414/22.62 |
| 5,203,073 | A * | 4/1993 | Kotake | B62D 65/02 29/771 |
| 6,112,390 | A * | 9/2000 | Takeda | B21D 39/021 219/121.31 |
| 7,484,290 | B2 * | 2/2009 | Henley | B23P 19/022 29/596 |
| 8,274,009 | B2 | 9/2012 | Kelley | |
| 2003/0115746 | A1 | 6/2003 | Saito | |

FOREIGN PATENT DOCUMENTS

| | | |
|---|---|---|
| DE | 20 2005 003 913 U | 7/2006 |
| DE | 60 2004 003 039 T | 3/2007 |
| DE | 10 2012 009 061 A | 11/2013 |
| DE | 10 2012 009 062 A | 11/2013 |
| DE | 10 2012 015 392 A | 5/2014 |
| EP | 0 642 878 A | 3/1995 |
| EP | 0642878 A | 3/1995 |
| EP | 1 085 962 B | 7/2002 |
| EP | 1 686 048 A | 8/2006 |
| EP | 1686048 A | 8/2006 |
| EP | 1 858 750 B | 11/2007 |
| EP | 2 279 929 B | 2/2011 |
| EP | 2279929 A | 2/2011 |
| WO | 2006094631 A | 9/2006 |
| WO | 2008/098719 A | 8/2008 |

* cited by examiner

PROCESSING STATION FOR FEEDING CLAMPING FRAMES INTO A WORKING AREA AND METHOD FOR CHANGING CLAMPING FRAMES

CROSS REFERENCE TO RELATED APPLICATIONS

This application is a U.S. National Stage Entry of International Patent Application Serial Number PCT/EP2017/077014, filed Oct. 23, 2017, which claims priority to German Patent Application No. DE 10 2016 221 569.8, filed Nov. 3, 2016, the entire contents of both of which are incorporated herein by reference.

FIELD

The present disclosure generally relates to a processing station, in particular, framing station for work-pieces formed as vehicle body parts.

BACKGROUND

Processing stations and framing stations are known and serve, for example, to clamp vehicle body parts in a predetermined accurate position and subsequently by a joining procedure ultimately to connect together said vehicle body parts. The joining procedure may be welding, adhesive bonding, riveting or even crimping. For the procedure of accurately positioning one body component, for example a side wall, to another body component, for example a floor assembly, so-called clamping frames are used. One or more of these clamping frames are held and/or stored in a magazine area and displaced and/or transported into the working area and back again by a feed device. A clamping frame is generally configured as an upright, substantially planar supporting frame on which a plurality of actuatable tensioners are held, the body parts being clamped together thereby at predetermined points in order to be joined there. A clamping frame is not configured per se to carry and to transport a body part, but merely to move a body component which has been prepositioned by means of a fish plate joint or even clipped to a second body component in a previous mounting step into a final structurally predetermined position.

A processing station is disclosed in DE 10 2012 009 061 A1 in which the clamping frame may be displaced via two transport systems on a suspended rail arrangement between a magazine area and a working area.

Suspended rail arrangements are not optimal at least when workpieces, for example welding systems and/or welding robots, have to be fed from above the working area as required.

EP 1 686 048 A2 discloses a processing station in which the clamping frames are displaced on a floor-based rail arrangement between a magazine area and working area.

In principle, the arrangement of the drive by which the feed device is driven causes difficulties in such arrangements. Thus there is the possibility of providing each clamping frame with a drive. This is complex and expensive. Moreover, there is the possibility of arranging a drive in the region of the rail arrangement of the feed device, wherein this nevertheless results in the requirement of having to transmit the drive power to the clamping frame to be displaced, if the need arises.

Thus a need exists for a processing station, where the feed device, a floor-based rail arrangement, and the drive are configured to displace the clamping frames in a space-saving and structurally simple manner.

DETAILED DESCRIPTION

Figure 1:
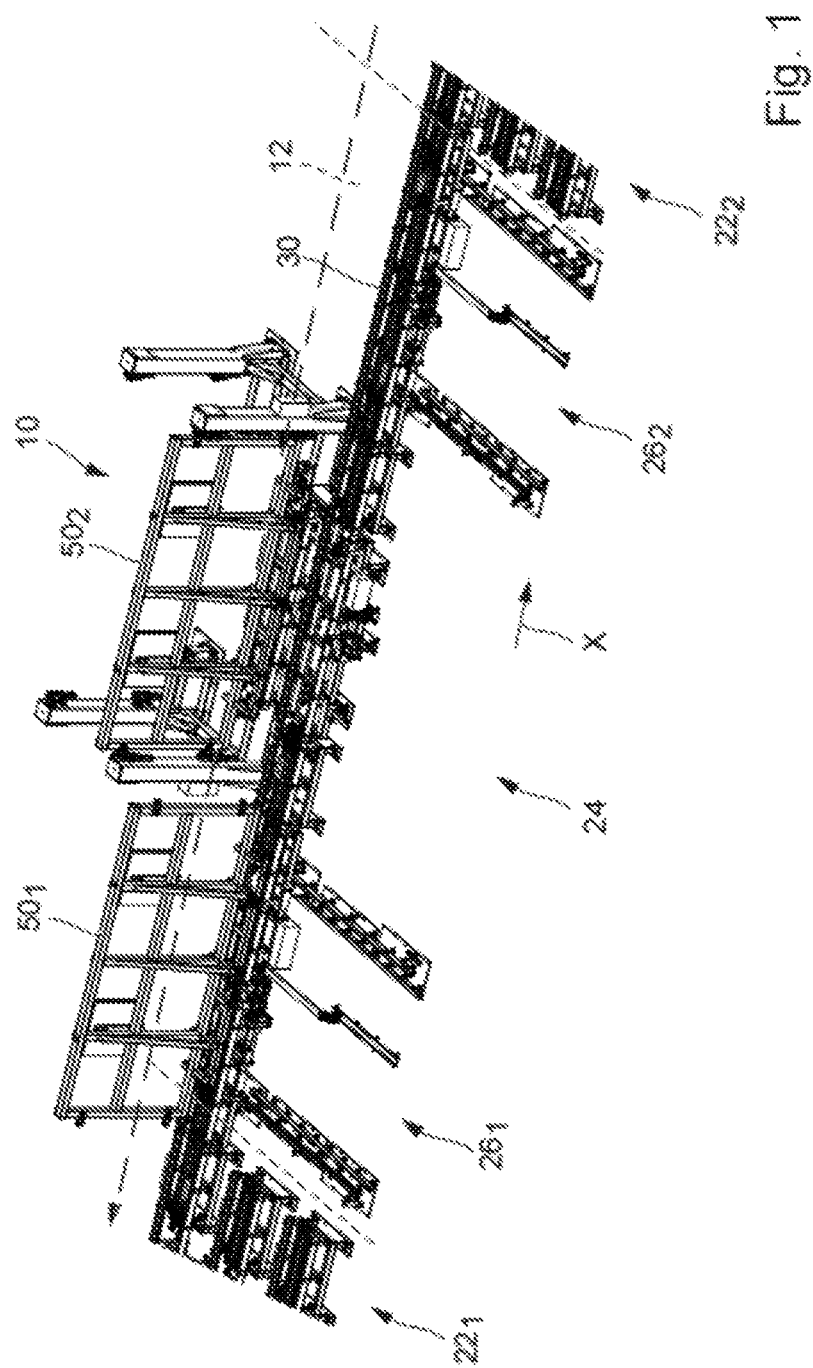
FIG. 1 is a schematic overall view of a processing station.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a processing station, in particular a framing station, for workpieces formed as vehicle body parts, having at least one clamping frame, at least one magazine area for holding the clamping frames, a working area for processing the workpieces and a feed device for feeding the clamping frames between the at least one magazine area and the working area in a longitudinal direction X and a transverse direction Y, wherein the feed device has a floor-based rail arrangement for guiding and carrying the guide frames.

In some examples, a processing station, in particular framing station, for workpieces formed as vehicle body parts, having at least one clamping frame, at least one magazine area for holding the clamping frames, a working area for processing the workpieces and a feed device for feeding the clamping frames between the at least one magazine area and the working area in a longitudinal direction X and a transverse direction Y, wherein the feed device has a floor-based rail arrangement for guiding and carrying the clamping frames and at least one drive arrangement with two transmission elements oriented parallel to the rail arrangement, wherein the transmission elements are able to be coupled independently of one another to the respective clamping frame to be fed, in order to displace the clamping frame in a coupled state in the longitudinal direction X.

A processing station according to the invention may be configured in a modular manner with regard to the magazine area and also the transfer area. For example, the magazine area may consist of two magazines so that the feed device connects each of these magazines to the working area.

A processing station according to the invention provides the advantage that the drive arrangement is integrated in the feed device and in this case the transmission elements are located in a space-saving manner parallel to the rail arrangement. As a result, providing each clamping frame with a separate drive may also be dispensed with. Moreover, by the provision of two transmission elements it is ensured that each transmission element may be designed per se to be shorter than the width of the clamping frames. However, two parallel transmission elements are also able to be embodied more easily than, for example, a telescopable arrangement of two telescopic elements.

Thus an advantageous embodiment of the invention provides that the transmission elements are configured as toothed rods. These toothed rods are able to be embodied in a simple manner in terms of production technology and are sufficiently robust in terms of wear in the harsh conditions of a production environment.

An advantageous embodiment of the invention provides that the drive arrangement comprises respective drives which are operatively connected to the transmission elements. As a result, it is ensured that the transmission elements may be moved independently of one another. Although a drive has to be provided for each transmission element, this may be embodied in a relative simple manner structurally in contrast to an arrangement in which each clamping frame has a drive.

An advantageous embodiment of the invention provides that a toothing of the toothed rods is oriented vertically downwardly. This results in the possibility of a space-saving arrangement of the drive for each toothed rod, since the drive may be positioned below the rail arrangement so that it is able to engage from below into the toothed rod located thereabove. Preferably, to this end the drive forms a drive pinion.

An advantageous embodiment of the invention provides that the clamping frames in each case comprise at least one roller arrangement, wherein the clamping frames are mounted via the roller arrangement opposite the rail arrangement. Thereby it is ensured that the weight of the clamping frame is carried by the rail arrangement. Moreover, by means of the roller arrangement it is ensured that an upright clamping frame provides as little resistance as possible relative to the drive arrangement when advanced.

An advantageous embodiment of the invention provides that driver elements are arranged on end regions of the transmission elements opposing one another in the longitudinal direction X, for coupling the clamping frames to the transmission elements. This results in a greater flexibility in the number of options for coupling the clamping frames to the transmission elements.

An advantageous embodiment of the invention provides that the drive arrangement preferably comprises pneumatically actuated actuators, via which the driver elements are able to be coupled to the clamping frames in the respective receiving positions of the transmission elements. It is advantageous if the actuators may be configured to be stationary relative to the rail arrangement, since they only have to carry out their actuating function in the receiving positions of the transmission elements. As a counterpart to the driver elements, the clamping frames preferably comprise coupling pins, via which the clamping frames are able to be positively coupled to the driver elements.

An advantageous embodiment of the invention provides that the feed device extends in the longitudinal direction X from the magazine area, via a transfer area as far as the working area, wherein the drive arrangement is arranged in the transfer area. In this case, a central arrangement of the drive arrangement is advantageously provided, starting from which the drive arrangement may displace both the clamping frames which are held in the magazine area and the clamping frames which are located in the working area.

An advantageous embodiment of the invention provides that the rail arrangement in the magazine area, in the transfer area and in the working area forms rail portions which are separate from one another. As a result, if required it is possible to displace the individual rail areas which are separate from one another in the transverse direction Y. In this case, it may be provided in particular that the rail portion arranged in the transfer area is able to be displaced by means of a second drive arrangement in the transverse direction Y. In a further embodiment, it may be provided that the rail portion arranged in the working area is able to be displaced by means of a third drive arrangement in the transverse direction Y.

The object is also achieved by a method for changing a clamping frame in a processing station as described above, wherein a first clamping frame is located in the working area in the processing position and at least one second clamping frame is located in the magazine area in a holding position, having the steps:

displacing the first clamping frame in the working area out of a processing position in the transverse direction Y;

coupling the first transmission element of the first drive arrangement to the first clamping frame;

displacing the first clamping frame via the first transmission element of the first drive arrangement in the longitudinal direction X from the working area into the transfer area into a receiving position;

displacing the second transmission element of the first drive arrangement in the longitudinal direction X into the receiving position;

coupling the second transmission element of the first drive arrangement to the first clamping frame;

uncoupling the first transmission element of the first drive arrangement from the first clamping frame;

displacing the first clamping frame via the second transmission element of the first drive arrangement in the longitudinal direction X into a transfer position in the transfer area;

displacing the first transmission element of the first drive arrangement into the transfer position.

An advantageous embodiment of the method provides that at the same time as the displacement of the first clamping frame via the first transmission element of the first drive arrangement into the receiving position in the transfer area, the following steps are carried out:

displacing the second clamping frame via the second transmission element of the second drive arrangement in the longitudinal direction X into a receiving position of a second transfer area;

displacing the first transmission element of the second drive arrangement in the longitudinal direction X into the receiving position of the second transfer area;

coupling the first transmission element of the second drive arrangement to the second clamping frame and uncoupling the second transmission element of the second drive arrangement from the second clamping frame;

displacing the second clamping frame via the first transmission element of the second drive arrangement in the longitudinal direction X from the receiving position of the transfer area into the working area;

displacing the second clamping frame in the working area into the processing position in the transverse direction Y.

FIG. 1 shows a schematic overall view of a processing station 10 according to an exemplary embodiment. The processing station 10 is arranged on the longitudinal side of a conveyor section 12. The conveyor section 12 in the present case is symbolized by an arrow shown in dashed lines and serves for continuously conveying workpieces, for example vehicle body parts. The workpieces are conveyed along the conveyor section 12 by means of conveying means, not shown. The processing station 10 serves for processing the workpieces in a designated portion of the conveyor section 12. The processing of the workpieces, for example, may comprise a joining procedure by means of welding robots, also not shown.

The embodiment shown of the processing station 10 initially comprises a centrally arranged working area 24, in each case adjacent transfer areas $26_1$ and $26_2$ on either side of the working area 24 and in turn in each case adjacent magazine areas $22_1$ and $22_2$ on either side of the transfer areas $26_1$, $26_2$. The processing of the workpieces previously described by way of example takes place in the working area 24. The processing station 10 further comprises a feed device 30 which connects together the working area 24, the transfer areas $26_1$, $26_2$ and the magazine areas $22_1$, $22_2$ in a longitudinal direction X parallel to the conveyor section 12. The feed device 30 serves for feeding clamping frames 50 from a magazine area $22_1$, $22_2$ via the respective transfer area $26_1$, $26_2$ into the working area 24. In the present case, two clamping frames $50_1$ and $50_2$ are shown, one thereof being located in the working area 24 and the other thereof being located in the transfer area $26_1$ in order, for example, to be fed to the magazine area $22_1$.

Figure 2:
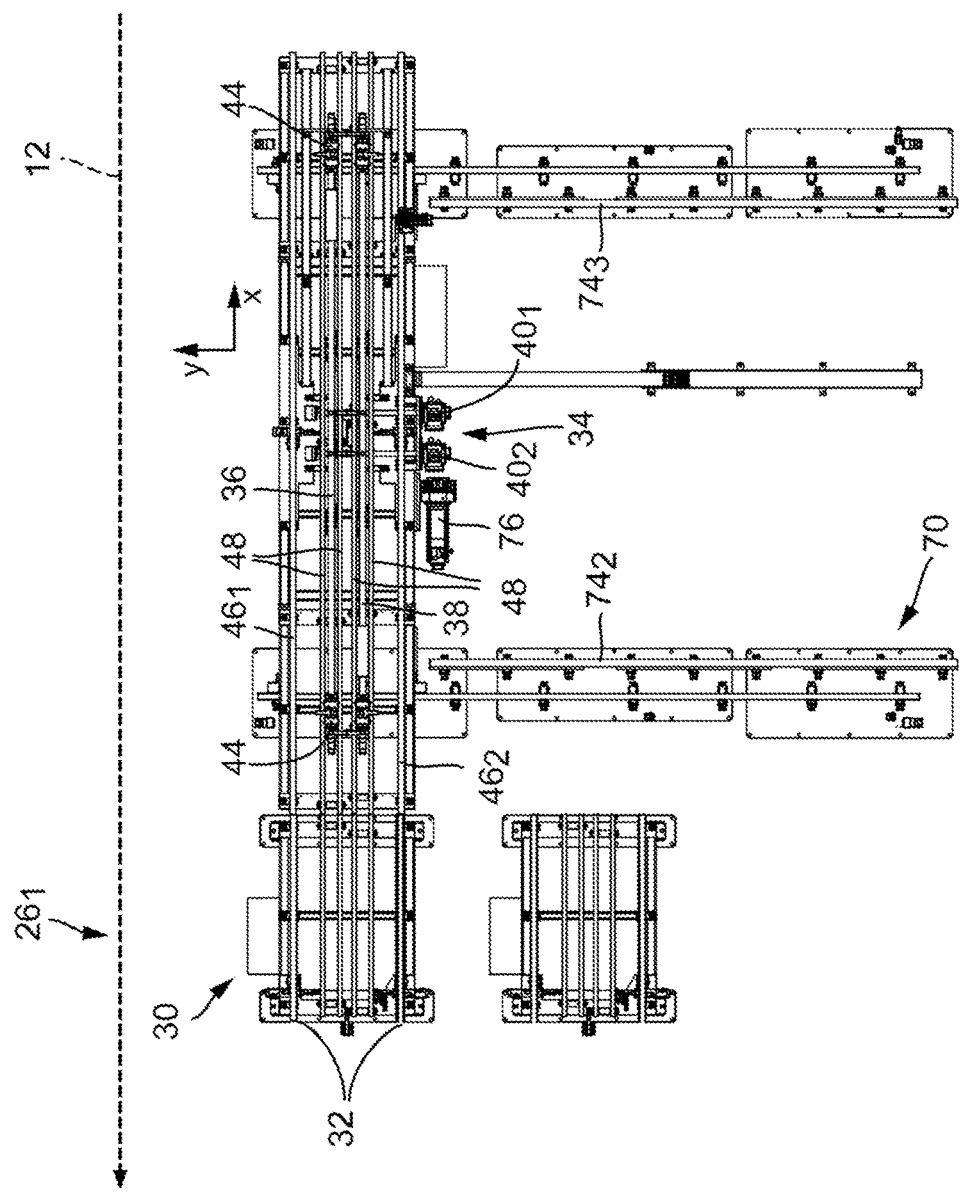
FIG. 2 is a detailed, plain view of the transfer area of a processing station.
Figure 3:
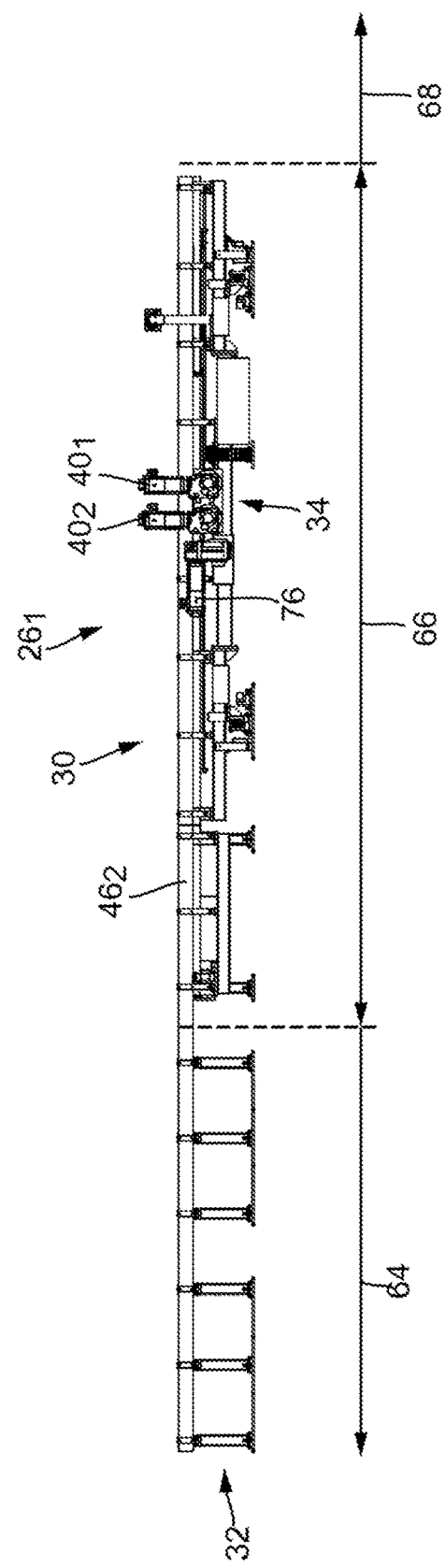
FIG. 3 is a detailed, side view of the transfer area of a processing station.

FIGS. 2 and 3 show a detail of the transfer area $26_1$; FIG. 2 in a plan view and FIG. 3 in a side view. It may be initially identified that the feed device 30 has a rail arrangement 32 for guiding and carrying the clamping frames 50, not shown here. The rail arrangement 32 has relative to the conveyor section 12 an internal rail $46_1$ and an external rail $46_2$. The rails $46_1$ and $46_2$ serve to guide and to carry the clamping frames 50 in the longitudinal direction X in a manner to be described in more detail. In this regard it is preferably provided that the rail arrangement 32 is merely configured as a passive component. It is also preferred if the rail arrangement 32 extends continuously over the magazine area 22, the transfer area 26 and the working area 24, wherein for each region 22, 26, 24 a rail portion 64, 66, 68 is, however, provided so as to be separated from the respectively adjacent portion but aligned therewith, as is illustrated in FIG. 3.

Moreover, the feed device 30 has a drive arrangement 34 which may be arranged substantially inside and parallel to the rail arrangement 32, wherein some or all of the components of the drive arrangement 34 may also be arranged below the horizontal plane of the rails $46_1$, $46_2$. The drive arrangement 34 has two transmission elements 36 and 38 extending parallel to one another and parallel to the rail arrangement 32. Preferably, the transmission elements 36, 38 are configured as toothed rods, wherein it may be provided that the respective toothing is oriented vertically downwardly. The transmission elements 36, 38 are arranged in FIG. 2 respectively in a central position relative to the transfer area $26_1$, so that this position may be denoted as the respective transfer position of the transmission elements 36, 38. Preferably, the transmission elements 36, 38 are guided on either side of the respective lateral guides 48, so that the transmission elements 36, 38 are displaceable inside the lateral guides 48 in the longitudinal direction X. It is provided that both transmission elements 36, 38 are displaceable, starting from the transfer position in both directions into one respective receiving position as is described further below.

The drive arrangement 34 further comprises a plurality of drives 40, wherein preferably two drives $40_1$ and $40_2$ which may be configured as electric motors are provided. The transmission element 36 may be displaced by means of the drive $40_1$ and the transmission element 38 may be displaced by means of the drive $40_2$ between the described transfer and receiving positions in the longitudinal direction X. Preferably, in each case a transmission element of the drives $40_1$, $40_2$ is designed as a gearwheel pinion so that each of the gearwheel pinions may be moved into a toothed engagement with the preferred embodiment of the transmission elements 36, 38 as toothed rods.

Figure 4:
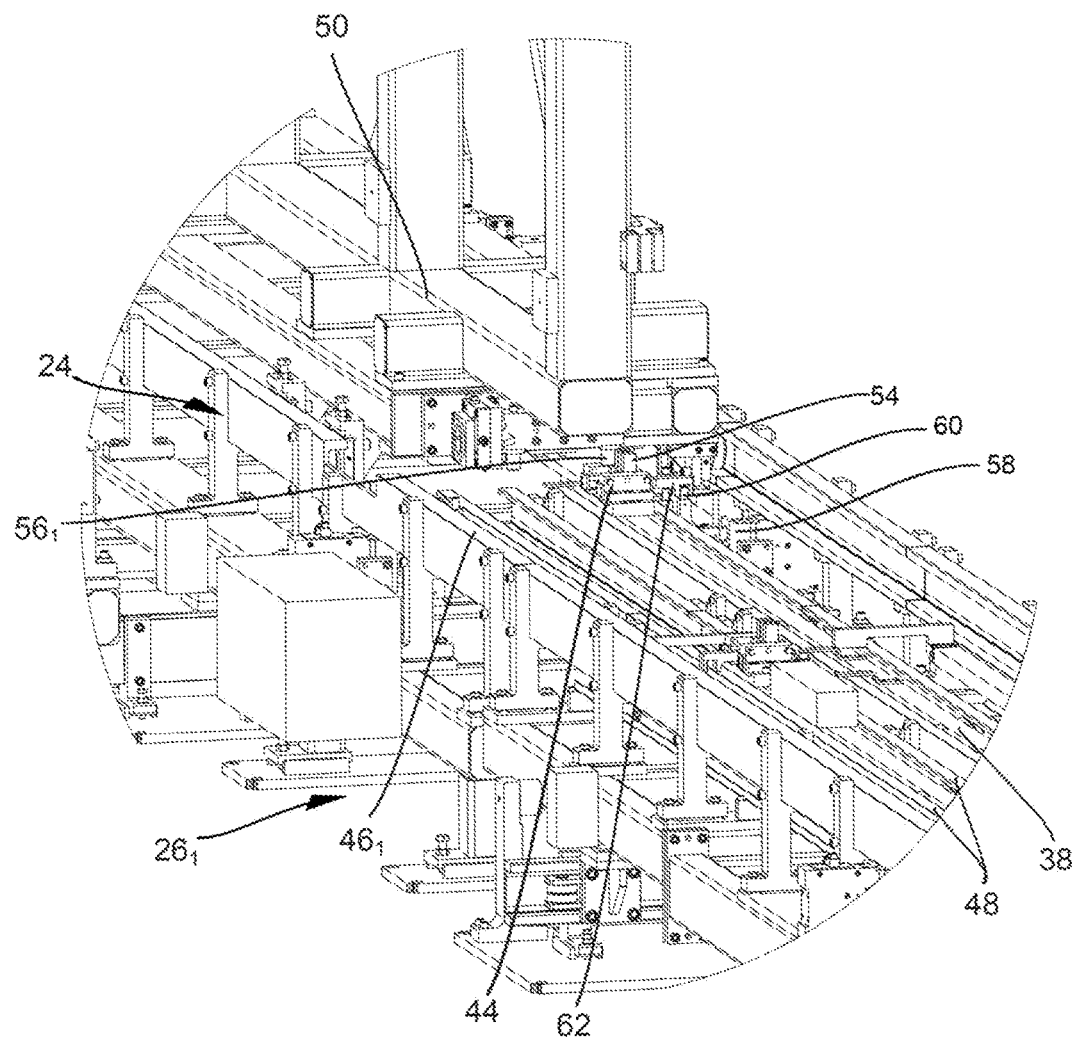
FIG. 4 is a further detailed, perspective view of a processing station.

In the end regions opposing one another in the longitudinal direction X the transmission elements 36, 38 have driver elements 44 for coupling the clamping frames 50 to the transmission elements 36, 38, in order to displace the clamping frames 50 into a coupled state in the longitudinal direction X along the feed device 30. To this end, the driver elements 44 may adopt a locked and an unlocked state relative to the clamping frame 50, as is shown with reference to FIG. 4. FIG. 4 shows a further detail of a processing station 10 according to the invention in a perspective view. A transition between the transfer area 26 and the working area 24 is shown. A clamping frame 50 carried by the feed device 30 is located in the working area 24. The transmission element 38 is displaced starting from the transfer position into a receiving position, so that one of the two driver elements 44 of the transmission element 38 is approximately positioned in the transition between the transfer area 26 and the working area 24. The driver element 44 has an upwardly protruding driver fork 54 which is movable in the transverse direction Y so that the driver element 44 is thereby able to adopt the locked and the unlocked state. In FIG. 4, the driver fork 54 is displaced into the unlocked position relative to the clamping frame 50. So that a positive connection is present between the driver element 44 and the clamping frame 50 in the locked position of the driver fork 54, in which this driver fork is displaced to the right relative to the view of FIG. 4, the clamping frame 50 has at least one downwardly facing coupling pin 56 which is positively encompassed by the driver fork 44. It is preferred if the clamping frame 50 has two coupling pins $56_1$, $56_2$ for each transmission element 36, 38 and namely in each case on lower end regions of the clamping frame 50 which are spaced apart in the longitudinal direction X.

Moreover, FIG. 4 enables one of the preferred plurality of actuators 58 to be identified, the driver element 44 being able to be actuated thereby between the locked and the unlocked state. Preferably the actuator 58 is pneumatically actuated. The actuator 58 transmits an actuating movement via a coupling pin 60 to an actuating fork 62 of the driver element 44. The actuating fork 62 transmits the actuating movement in turn inside the driver element onto the driver fork 54. The actuator 58 is held immovably relative to the feed device 30 in the longitudinal direction X.

Figure 5:
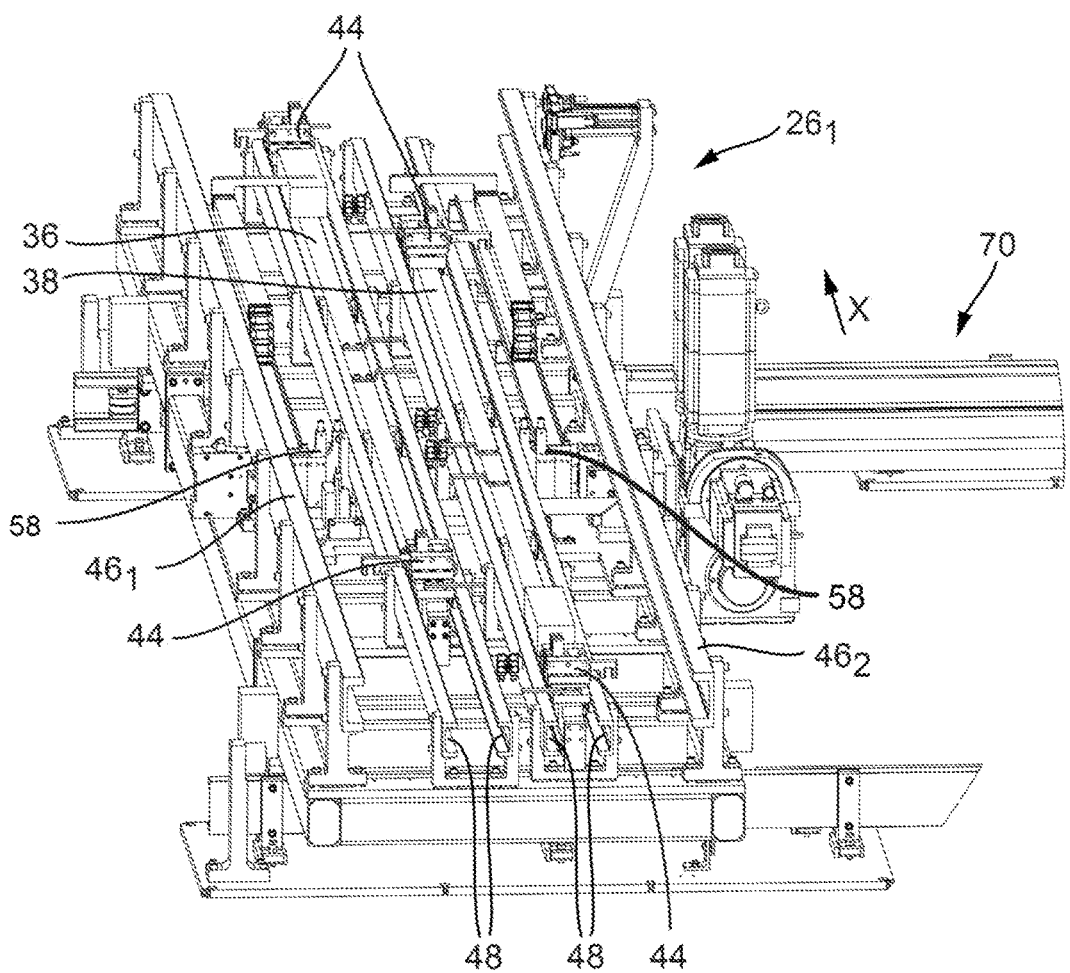
FIG. 5 is a detailed, perspective view of the transfer area of a processing station.

FIG. 5 shows a perspective view of the transfer area $26_1$ of a processing station 10 according to the invention. Six actuators 58 are shown, wherein three actuators 58 are assigned to the transmission element 36 and may be arranged between said transmission element and the rail $46_1$ and three actuators 58 are assigned to the transmission element 38 and may be arranged between said transmission element and the rail $46_2$. The spacing in the longitudinal direction X of the two external actuators 58 to the central actuator 58 of each transmission element 36, 38 preferably corresponds to exactly the length of the transmission element 36, 38 in the longitudinal direction X and/or the spacing of the driver elements 44 of the transmission element 36, 38.

Moreover, a second drive arrangement 70 is provided, as may be derived from the plan view shown in FIG. 2. Preferably, the second drive arrangement 70 is provided to displace at least the rail portion 66 of the transfer area 26 in the transverse direction Y. To this end, the second drive arrangement 70 comprises a rail arrangement 72 which, for example, may have three rails $74_1$, $74_2$ and $74_3$ spaced apart from one another in parallel. Also the second drive arrangement 70 comprises a third drive 76 in order to displace the rail portion 66 driven on the rails 74 in the transverse direction Y. Further preferably, together with the rail portion 66 the first drive arrangement 34, i.e. the transmission elements 36, 38 and the drives $40_1$, $40_2$ are able to be displaced in the transverse direction Y. Preferably one of the rails $74_1$, $74_2$, $74_3$ is provided with a linear toothing, so that a displacement movement may be initiated via a toothed engagement into a gearwheel pinion of the drive 76.

Figure 6:
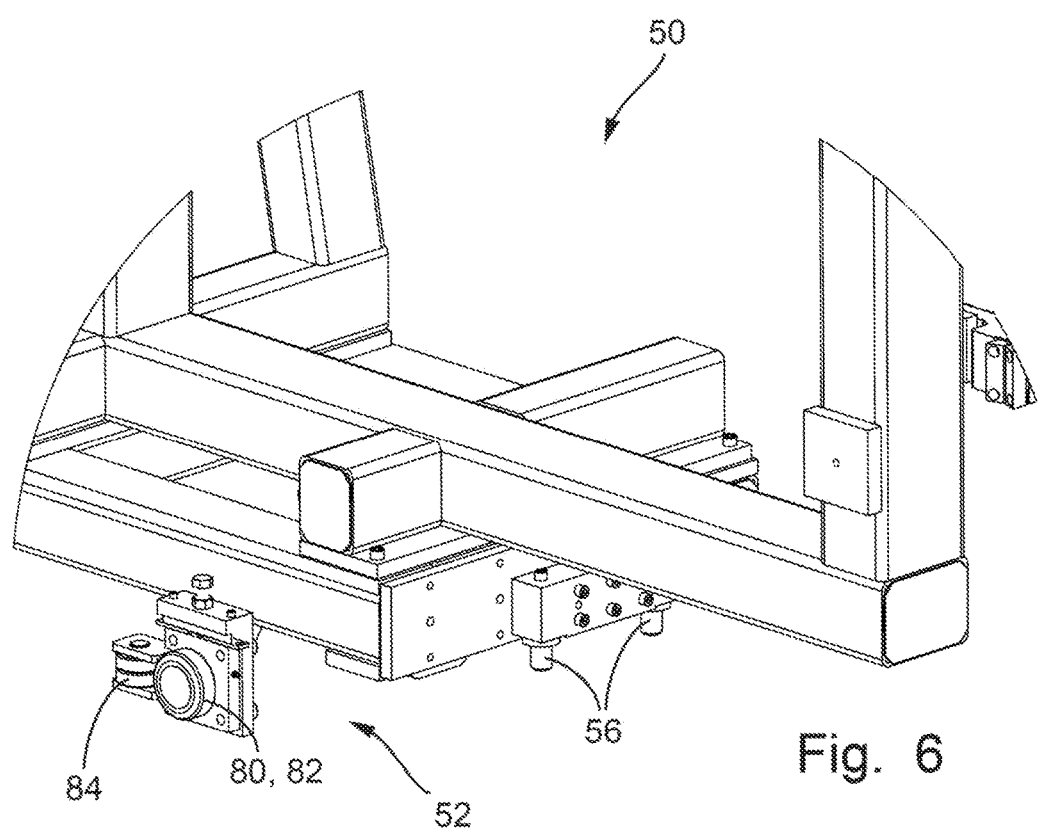
FIG. 6 is a detailed view of a clamping frame.

FIG. 6 shows a detail of a lower external end region of a clamping frame 50. A part of a roller arrangement 52 via which a clamping frame 50 is carried and guided by the rails $46_1$, $46_2$ may be identified, in particular. It may be provided that the roller arrangement 52 consists of four roller units 78, wherein each of the roller units 78 is arranged in the region of the lower corners of the clamping frame 50. A roller unit 78 may have a support roller 80, a first guide roller 82 and a second guide roller 84. In this case, the support roller 80 is designed such that it transmits a vertical load of the clamping frame 50 downwardly onto the rails $46_1$, $46_2$. The first guide roller 82 is arranged in parallel, upwardly offset relative to the support roller 80, and is designed such that it transmits a vertical load of the clamping frame 50 upwardly onto the rails $46_1$, $46_2$. The second guide roller 84 has a vertical rotational axis and is designed such that it guides the displacement movement of the clamping frame 50 relative to the rails $46_1$, $46_2$ in the lateral direction.

Figure 7:
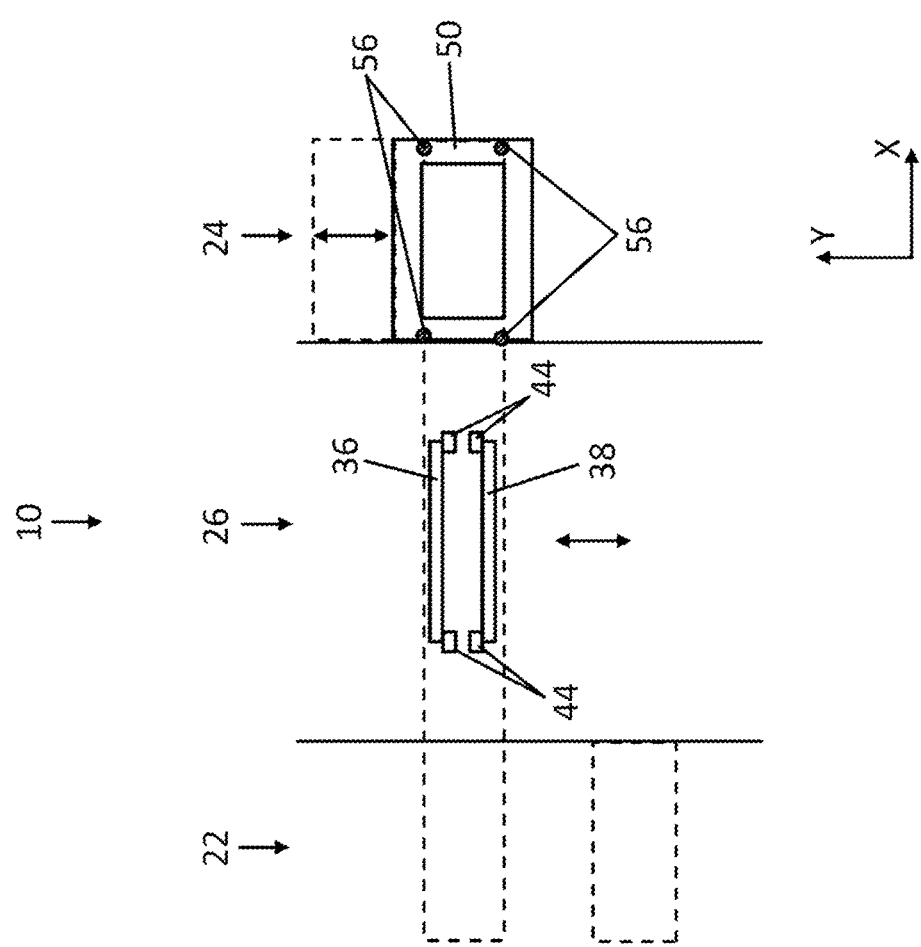
FIGS. 7-9 are schematic views of a processing station in different displaced positions.
Figure 8:
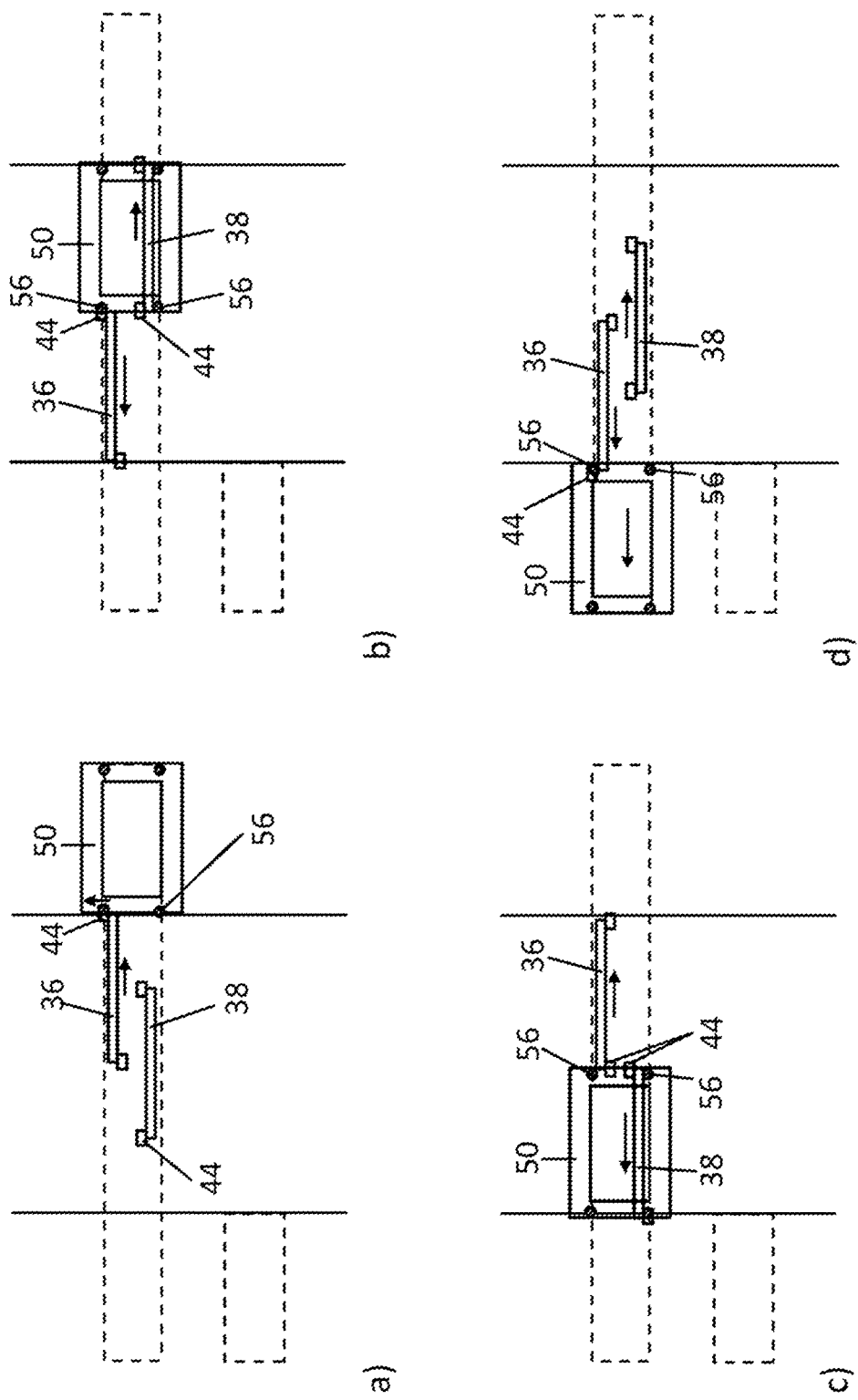

A method for changing a clamping frame 50 in a processing station 10 is described with reference to FIGS. 7 to 8d). A schematic view of a processing station 10 with the already described subdivision into the magazine area 22, transfer area 26 and the working area 24 is shown. In the upper region of the working area 24 generally a so-called geobox is arranged in which the actual processing of the workpieces takes place and onto which a currently required clamping frame 50 is advanced by a movement in the transverse direction Y, which is symbolized by the double arrow and the box shown in dashed lines. FIG. 7 shows a clamping frame 50 which is arranged in the working area 26 in a non-advanced position, i.e. in a position withdrawn from the processing position. Four coupling pins 56 are shown for the clamping frame 50. The two transmission elements 36, 38 are shown in their respective transfer position. In each case, the two driver elements 44 for the transmission elements 36, 38 are shown. Moreover, the possibility of displacing the rail portion 66 and the first drive arrangement 34 in the transverse direction Y is symbolized by the double arrow below the transmission elements 36, 38. The magazine area 22 in the present case contains two park positions for clamping frames 50. In this case the upper park position may be reached via a single displacement movement of the clamping frame 50 in the longitudinal direction X, whereas the lower park position may be reached via a combined displacement movement both in the longitudinal direction X and in the transverse direction Y.

FIG. 8a) shows the method step according to which the transmission element 36 is displaced from the transfer position into a receiving position in the direction of the working area 22. Moreover, the driver element 44 is displaced into the locked position so that it positively encompasses the coupling pin 56. Both movements are symbolized by an arrow. FIG. 8b) shows the method step according to which the clamping frame 50 has been pulled by the transmission element 36 into the transfer area 26. In this case, the transmission element 36 has covered a displacement distance in the longitudinal direction X corresponding to double its length. Preferably, at the same time the transmission element 38 is displaced from the transfer position in the direction of the working area 24, so that subsequent to these displacement movements the transmission element 38 is arranged so as to be congruent with the clamping frame 50. In a next method step, which is not shown separately, the driver elements 44 are transferred on the left-hand side of the clamping frame 50 into the respective other position, i.e. the driver element 44 of the transmission element 36 is unlocked and the driver element 44 of the transmission element 38 is locked.

FIG. 8c) shows the method step in which the clamping frame 50 has been displaced by the transmission element 38 through the transfer area 26 so that, as a result, the clamping frame 50 is located in front of the magazine area 22. In a subsequent method step, which is not shown separately, the driver elements 44 are transferred into the respective other position on the right-hand side of the clamping frame 50, i.e. the driver element 44 of the transmission element 38 is unlocked and the driver element 44 of the transmission element 36 is locked. FIG. 8d) shows the method step in which the clamping frame has been displaced by the transmission element 36 in the magazine area 22, in order to be stored there until the next use.

Figure 9:
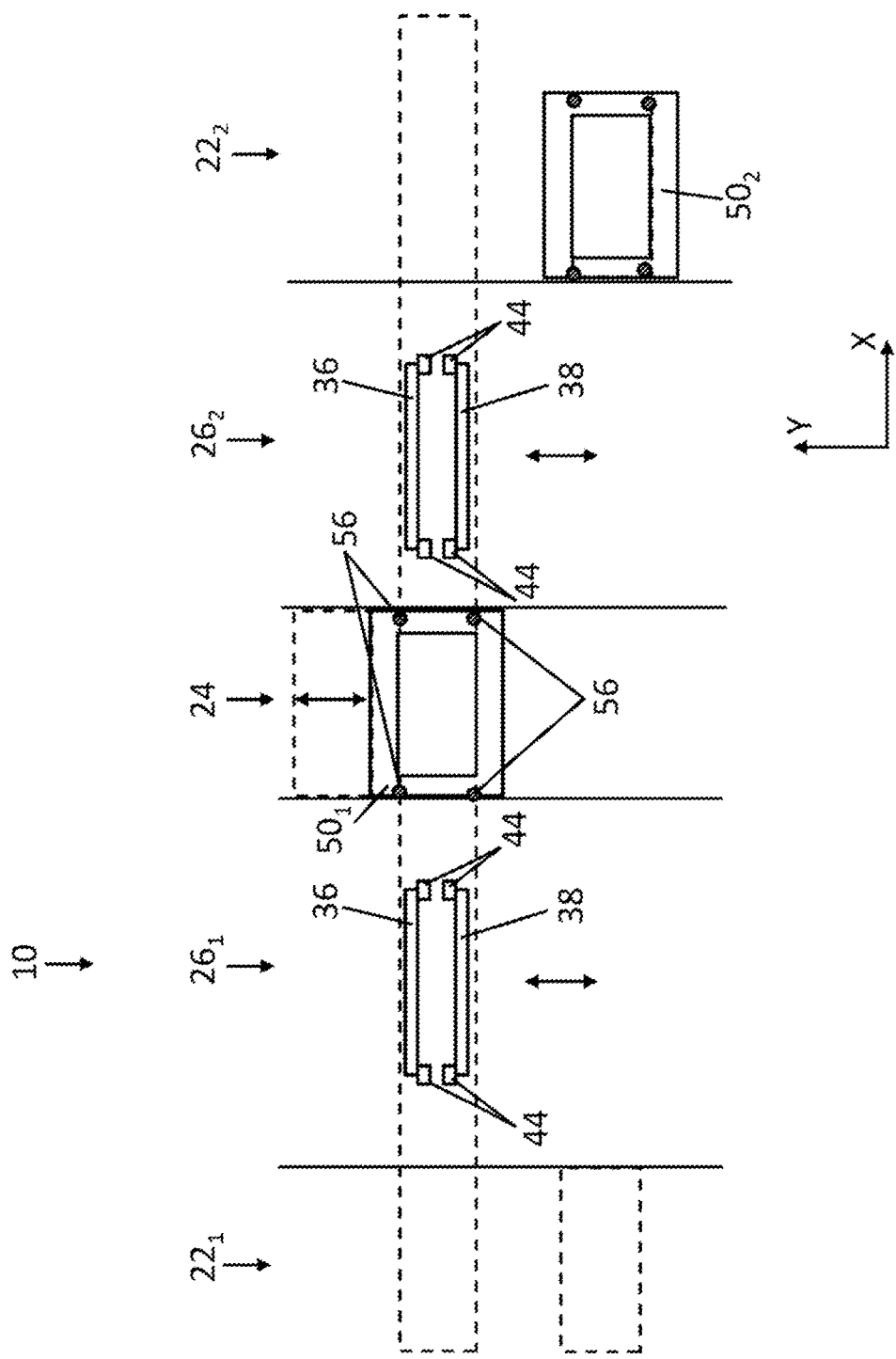

FIG. 9 shows a further embodiment of a processing station 10 according to the invention which substantially corresponds to the view of FIG. 1. The processing station shown has on either side of the working area 24 in each case a transfer area $26_1$, $26_2$ and in each case a magazine area $22_1$, $22_2$. A clamping frame $50_1$ is arranged in the working area 24 and a second clamping frame $50_2$ is arranged in the right-hand magazine area $22_2$ in a holding position. The manner of the displacement of the clamping frames $50_1$, $50_2$ corresponds in principle to the procedure as described relative to FIG. 8. The arrangement shown in FIG. 9 results in the possibility of feeding in a second clamping frame $50_2$ for a second body type in a time-saving manner. To this end, the second clamping frame $50_2$ which, for example, may be provided for a second body type, may be initially displaced into the transfer area $26_2$. Subsequently the clamping frame $50_1$ which is currently located in the working area 24 is moved in the direction of the transfer area $26_2$, so that the working area 24 is free and the second clamping frame $50_2$ may be retracted from the transfer area $26_2$.

LIST OF REFERENCE NUMERALS

10 Processing station
12 Conveyor section
22 Magazine area
24 Working area
26 Transfer area
30 Feed device 32 Rail arrangement
34 Drive arrangement
36 Transmission element
38 Transmission element
40 Drive
42 Toothing
44 Driver element
46 Rail
48 Lateral guide
50 Clamping frame
52 Roller arrangement
54 Driver fork
56 Coupling pin
58 Actuator
60 Coupling pin
62 Actuating fork
64 Rail area
66 Rail area
68 Rail area
70 Drive arrangement
72 Rail arrangement
74 Rail
76 Drive
78 Roller unit
80 Support roller
82 Guide roller
84 Guide roller

What is claimed is:

1. A processing station for workpieces formed as vehicle body parts, comprising:
a plurality of clamping frames,
a magazine area configured to hold the clamping frames,
a working area configured to process the workpieces, and
a feed device configured to feed the clamping frames between the magazine area and the working area in a longitudinal direction and a transverse direction,
wherein the feed device has a floor-based rail arrangement configured to guide and carry the clamping frames and a first drive arrangement with two transmission elements oriented parallel to the rail arrangement, wherein the transmission elements are configured to be coupled independently of one another to a respective one of the clamping frames to be fed, in order to displace the coupled clamping frame in the longitudinal direction.

2. The processing station of claim 1, wherein the station is a framing station.

3. The processing station of claim 1, wherein the transmission elements comprise toothed rods for transmitting the displacement movement in the longitudinal direction.

4. The processing station of claim 1, wherein the drive arrangement comprises respective drives which are operatively connected to the transmission elements.

5. The processing station of claim 3, wherein a toothing of the toothed rods is oriented vertically downwardly.

6. The processing station of claim 1, wherein the clamping frames each comprise at least one roller arrangement, wherein the clamping frames are mounted via the roller arrangement opposite the rail arrangement.

7. The processing station of claim 1, wherein driver elements are arranged on end regions of the transmission elements opposing one another in the longitudinal direction and configured to couple the clamping frames to the transmission elements.

8. The processing station of claim 7, wherein the drive arrangement comprises pneumatically actuated actuators, via which the driver elements are configured to couple to the clamping frames in the respective receiving positions of the transmission elements.

9. The processing station of claim 8, wherein the clamping frames comprise coupling pins, via which the clamping frames are configured to positive couple to the driver elements.

10. The processing station of claim 1, wherein the feed device extends in the longitudinal direction from the magazine area, via a transfer area into the working area, wherein the drive arrangement is arranged in the transfer area.

11. The processing station of claim 10, wherein the rail arrangement in the magazine area, in the transfer area and in the working area forms rail portions which are separate from one another.

12. The processing station of claim 11, wherein the rail portion arranged in the transfer area is configured to be displaced by a second drive arrangement in the transverse direction.

13. The processing station of claim 11, wherein the rail portion arranged in the working area is configured to be displaced by a third drive arrangement in the transverse direction.

14. A method for changing a clamping frame in a processing station, wherein a first clamping frame is located in a working area in a processing position and a second clamping frame is located in a magazine area in a holding position, the method comprising:
displacing the first clamping frame in the working area out of the processing position in a transverse direction;
coupling a first transmission element of a first drive arrangement to the first clamping frame;
displacing the first clamping frame via the first transmission element of the first drive arrangement in a longitudinal direction from the working area into a transfer area into a receiving position;
displacing a second transmission element of the first drive arrangement in the longitudinal direction into the receiving position;
coupling the second transmission element of the first drive arrangement to the first clamping frame;
uncoupling the first transmission element of the first drive arrangement from the first clamping frame;
displacing the first clamping frame via the second transmission element of the first drive arrangement in the longitudinal direction into a transfer position in the transfer area; and
displacing the first transmission element of the first drive arrangement into the transfer position.

15. The method of claim 14, in which at the same time as the displacement of the first clamping frame via the first transmission element of the first drive arrangement into the receiving position in the transfer area, the following steps are carried out:
displacing the second clamping frame via the second transmission element of the second drive arrangement in the longitudinal direction into a receiving position of a second transfer area;
displacing the first transmission element of a second drive arrangement in the longitudinal direction into the receiving position of the second transfer area;
coupling the first transmission element of the second drive arrangement to the second clamping frame and uncoupling the second transmission element of the second drive arrangement from the second clamping frame;
displacing the second clamping frame via the first transmission element of the second drive arrangement in the longitudinal direction from the receiving position of the transfer area into the working area; and displacing the second clamping frame in the working area into the processing position in the transverse direction.

* * * * *